US010471301B2

(12) United States Patent
Yang et al.

(10) Patent No.: US 10,471,301 B2
(45) Date of Patent: Nov. 12, 2019

(54) METHOD AND SYSTEM FOR 3D ONLINE SPORTS ATHLETICS

(71) Applicant: Beijing Pico Technology Co., Ltd., Hai Dian District (CN)

(72) Inventors: Xiangchen Yang, Hai Dian District (CN); Kai Liu, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 86 days.

(21) Appl. No.: 15/344,344

(22) Filed: Nov. 4, 2016

(65) Prior Publication Data
US 2017/0296872 A1 Oct. 19, 2017

(30) Foreign Application Priority Data
Apr. 18, 2016 (CN) .......................... 2016 1 0244583

(51) Int. Cl.
*A63B 24/00* (2006.01)
*A63F 13/212* (2014.01)
(Continued)

(52) U.S. Cl.
CPC ...... *A63B 24/0021* (2013.01); *A63B 24/0084* (2013.01); *A63F 13/211* (2014.09);
(Continued)

(58) Field of Classification Search
CPC .............................. G06F 3/011; A63F 13/212
See application file for complete search history.

(56) References Cited

U.S. PATENT DOCUMENTS 7,972,245 B2 7/2011 Temple et al.
9,459,454 B1 * 10/2016 The ...................... G02B 27/017
(Continued)

FOREIGN PATENT DOCUMENTS

CN 1632723 A 6/2005
CN 103657029 A 3/2014
(Continued)

OTHER PUBLICATIONS

State Intellectual Property Office of the People's Republic of China, Office Action in Chinese Patent Application No. 201610244583.1 dated Sep. 15, 2017.
(Continued)

*Primary Examiner* — Jay Trent Liddle
(74) *Attorney, Agent, or Firm* — LK Global | Lorenz & Kopf, LLP

(57) ABSTRACT

A system for 3D online sports athletics includes: a cloud server and several head-mounted devices, wherein each of the head-mounted devices is paired with an intelligent terminal having a step counting function. A 3D scene virtualizing unit virtualizing a 3D online sports athletics scene to display the virtualized objects of all the head-mounted device users. A wirelessly connecting unit wirelessly connecting the intelligent terminal that it is paired with and the cloud server. A processing unit acquiring step counting data of the intelligent terminal and uploading the step counting data to the cloud server, and acquiring the step counting data of other head-mounted devices from the cloud server, driving the 3D scene virtualizing unit to display online the step counting data of each of the head-mounted device users in its 3D online running athletics scene, to realize sports athletics where a plurality of persons are simultaneously online.

8 Claims, 1 Drawing Sheet

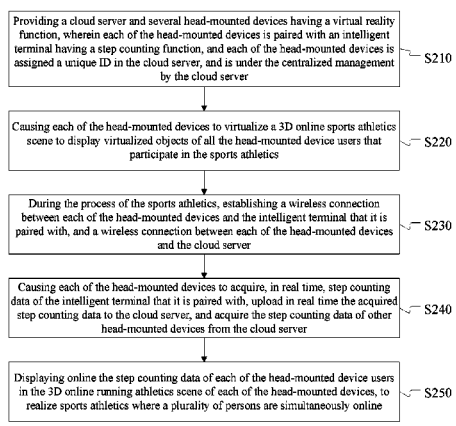

(51) Int. Cl.

| | | |
|---|---|---|
| *G02B 27/01* | (2006.01) | |
| *G06F 3/033* | (2013.01) | |
| *G06Q 50/00* | (2012.01) | |
| *G06F 3/01* | (2006.01) | |
| *A63F 13/25* | (2014.01) | |
| *A63F 13/211* | (2014.01) | |
| *A63F 13/35* | (2014.01) | |
| *A63F 13/5255* | (2014.01) | |

(52) U.S. Cl.
CPC ............ *A63F 13/212* (2014.09); *A63F 13/25* (2014.09); *A63F 13/35* (2014.09); *A63F 13/5255* (2014.09); *G02B 27/017* (2013.01); *G06F 3/011* (2013.01); *G06F 3/033* (2013.01); *G06Q 50/01* (2013.01); *A63B 2024/0025* (2013.01); *A63B 2024/0028* (2013.01); *G02B 2027/014* (2013.01)

(56) References Cited

U.S. PATENT DOCUMENTS

| | | | | |
|---|---|---|---|---|
| 2002/0054174 | A1* | 5/2002 | Abbott | G06F 1/163 715/863 |
| 2002/0070916 | A1* | 6/2002 | Noro | A63F 13/10 345/156 |
| 2006/0247049 | A1* | 11/2006 | Noro | A63F 13/10 463/37 |
| 2009/0091583 | A1* | 4/2009 | McCoy | A63F 13/02 345/633 |
| 2010/0035688 | A1* | 2/2010 | Picunko | A43B 3/0005 463/39 |
| 2011/0270135 | A1* | 11/2011 | Dooley | A61B 5/1114 600/595 |
| 2012/0142415 | A1* | 6/2012 | Lindsay | G06T 19/006 463/33 |
| 2012/0142416 | A1* | 6/2012 | Joutras | A63B 24/0006 463/36 |
| 2015/0174480 | A1* | 6/2015 | Vago | H04L 67/42 463/42 |
| 2015/0178939 | A1* | 6/2015 | Bradski | G02B 27/017 345/633 |
| 2016/0026253 | A1* | 1/2016 | Bradski | G02B 27/225 345/8 |
| 2016/0100034 | A1* | 4/2016 | Miller | H04L 67/38 709/205 |
| 2016/0187969 | A1* | 6/2016 | Larsen | G06F 3/012 345/156 |
| 2016/0232715 | A1* | 8/2016 | Lee | G06T 19/006 |
| 2016/0314620 | A1* | 10/2016 | Reilly | G09G 5/18 |
| 2016/0361643 | A1* | 12/2016 | Allin | G06F 3/0325 |
| 2017/0031439 | A1* | 2/2017 | Connor | G06T 19/006 |
| 2018/0077407 | A1* | 3/2018 | Young | H04N 13/0278 |

FOREIGN PATENT DOCUMENTS

| | | |
|---|---|---|
| CN | 104857704 A | 8/2015 |
| CN | 204745623 U | 11/2015 |
| CN | 105159662 A | 12/2015 |
| JP | 2008099834 A | 5/2008 |
| KR | 20020030755 A | 4/2002 |

OTHER PUBLICATIONS

State Intellectual Property Office of the People's Republic of China, Office Action in Chinese Patent Application No. 201610244583.1 dated Jul. 4, 2018.

\* cited by examiner

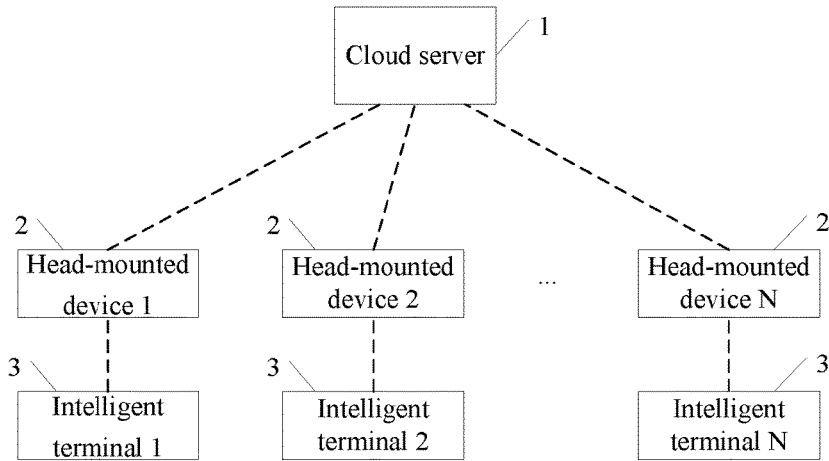

FIG. 1

Providing a cloud server and several head-mounted devices having a virtual reality function, wherein each of the head-mounted devices is paired with an intelligent terminal having a step counting function, and each of the head-mounted devices is assigned a unique ID in the cloud server, and is under the centralized management by the cloud server — S210

Causing each of the head-mounted devices to virtualize a 3D online sports athletics scene to display virtualized objects of all the head-mounted device users that participate in the sports athletics — S220

During the process of the sports athletics, establishing a wireless connection between each of the head-mounted devices and the intelligent terminal that it is paired with, and a wireless connection between each of the head-mounted devices and the cloud server — S230

Causing each of the head-mounted devices to acquire, in real time, step counting data of the intelligent terminal that it is paired with, upload in real time the acquired step counting data to the cloud server, and acquire the step counting data of other head-mounted devices from the cloud server — S240

Displaying online the step counting data of each of the head-mounted device users in the 3D online running athletics scene of each of the head-mounted devices, to realize sports athletics where a plurality of persons are simultaneously online — S250

FIG. 2

METHOD AND SYSTEM FOR 3D ONLINE SPORTS ATHLETICS

CROSS-REFERENCE TO RELATED APPLICATIONS

This application claims the benefit and priority of Chinese Patent Application No. 201610244583.1 filed Apr. 18, 2016. The entire disclosure of the above application is incorporated herein by reference.

TECHNICAL FIELD

The present application pertains to the technical field of virtual reality technology, and particularly to a method and system for 3D online sports athletics.

BACKGROUND

In recent years, as people are paying more and more attention to their health conditions, more and more people choose to do physical training in gymnasium. Because the exercising all alone is difficult to be persisted in and is quite boring, people commonly hope that they can find a friend having a common goal to do physical training together.

Currently, because the approaches are rare, to find a friend having a common goal to do physical training together is difficult. Even if one can find a friend that he can exercise together with, it is difficult for the two persons to exercise at the same time and at the same location.

In addition, other objects, desirable features and characteristics will become apparent from the subsequent summary and detailed description, and the appended claims, taken in conjunction with the accompanying drawings and this background.

SUMMARY

In view of the above problems, the present disclosure provides a method and system for 3D online sports athletics, to realize the physical training of a plurality of persons simultaneously.

To achieve the above object, the technical solutions of the present disclosure are realized as follows:

In one aspect, the present disclosure provides a system for 3D online sports athletics, comprises: a cloud server and several head-mounted devices having a virtual reality function, wherein each of the head-mounted devices is paired with an intelligent terminal having a step counting function, and each of the head-mounted devices is assigned a unique ID in the cloud server, and is under centralized management by the cloud server;

each of the head-mounted devices comprises a 3D scene virtualizing unit, a wirelessly connecting unit and a processing unit;

the 3D scene virtualizing unit is configured to virtualize a 3D online sports athletics scene to display virtualized objects of all head-mounted device users that participate in the sports athletics;

the wirelessly connecting unit is configured to, during the sports athletics, wirelessly connect the intelligent terminal that it is paired with and the cloud server; and the processing unit is configured to acquire, via the wirelessly connecting unit, in real time, step counting data of the intelligent terminal that it is paired with, upload in real time the acquired step counting data to the cloud server, and acquire the step counting data of other head-mounted devices from the cloud server; and drive the 3D scene virtualizing unit to display online the step counting data of each of the head-mounted device users in its 3D online running athletics scene, to realize a sports athletics where a plurality of persons are simultaneously online.

Preferably, the several head-mounted devices comprise one master head-mounted device, and other head-mounted devices than the master head-mounted device are slave head-mounted devices; and the processing unit of the master head-mounted device is further configured to, at starting of the sports athletics, determine slave head-mounted device users that participate in the sports athletics, and send IDs of all the head-mounted devices that participate in the sports athletics and a preset competition rule to the cloud server, wherein the competition rule comprises sports scene, time and distance.

More preferably, the master head-mounted device maintains a friend list therein, and the processing unit of the master head-mounted device is specifically configured to send an invitation to head-mounted devices that are in the friend list and determine slave head-mounted device users that participate in the sports athletics;

and/or, the master head-mounted device further comprises a positioning unit, and the processing unit of the master head-mounted device is specifically configured to, according to position information that is positioned by the positioning unit, send an invitation to nearby head-mounted devices and determine slave head-mounted device users that participate in the sports athletics.

Preferably, each of the head-mounted devices further comprises a microphone for picking up a voice command;

the processing unit of each of the head-mounted devices is further configured to convert the voice command picked up by the microphone into a digital voice command, and send the digital voice command to the cloud server; and the cloud server is configured to, according to the received digital voice command, select a corresponding animation effect from an animation effect library stored in itself and send the corresponding animation effect to each of the head-mounted devices that participate in the sports athletics, in order to display the animation effect in the 3D online sports athletics scene of each of the head-mounted devices.

More preferably, the cloud server is further configured to, during the sports athletics, according to the step counting data uploaded in real time by each of the head-mounted devices that participate in the sports athletics, rank online athletics results and send the ranked results to each of the head-mounted devices that participate in the sports athletics, in order to display the ranked results in the 3D online sports athletics scene of each of the head-mounted devices; and after the sports athletics is finished, save the athletics results as historical data.

In another aspect, the present disclosure provides a method for 3D online sports athletics, comprises:

providing a cloud server and several head-mounted devices having a virtual reality function, wherein each of the head-mounted devices is paired with an intelligent terminal having a step counting function, and each of the head-mounted devices is assigned a unique ID in the cloud server, and is under centralized management by the cloud server;

causing each of the head-mounted devices to virtualize a 3D online sports athletics scene to display virtualized objects of all head-mounted device users that participate in the sports athletics;

during the sports athletics, establishing a wireless connection between each of the head-mounted devices and the intelligent terminal that it is paired with, and a wireless connection between each of the head-mounted devices and the cloud server;

causing each of the head-mounted devices to acquire, in real time, step counting data of the intelligent terminal that it is paired with, upload in real time the acquired step counting data to the cloud server, and acquire the step counting data of other head-mounted devices from the cloud server; and displaying online the step counting data of each of the head-mounted device users in a 3D online running athletics scene of each of the head-mounted devices, to realize sports athletics where a plurality of persons are simultaneously online.

Preferably, the several head-mounted devices comprise one master head-mounted device, and other head-mounted devices than the master head-mounted device are slave head-mounted devices; and at starting of the sports athletics, the master head-mounted device determines slave head-mounted devices that participate in the sports athletics, and sends IDs of all the head-mounted devices that participate in the sports athletics and a preset competition rule to the cloud server, wherein the competition rule comprises sports scene, time and distance.

More preferably, that the master head-mounted device determines slave head-mounted devices that participate in the sports athletics comprises:

the master head-mounted device sends an invitation to head-mounted devices that are in its friend list and determines slave head-mounted devices that participate in the sports athletics; and/or, the master head-mounted device, according to its position information, sends an invitation to nearby head-mounted devices and determines slave head-mounted devices that participate in the sports athletics.

Preferably, the method further comprises:
providing a microphone on each of the head-mounted devices, and utilizing the microphone to pick up a voice command of its user;

when the microphone of the head-mounted device has picked up the voice command, the head-mounted device converting the voice command into a digital voice command and sending the digital voice command to the cloud server; and the cloud server, according to the received digital voice command, selecting a corresponding animation effect from an animation effect library stored in itself and sending the corresponding animation effect to each of the head-mounted devices that participate in the sports athletics, in order to display the animation effect in the 3D online sports athletics scene of each of the head-mounted devices.

More preferably, the method further comprises:
during the sports athletics, the cloud server, according to the step counting data uploaded in real time by each of the head-mounted devices that participate in the sports athletics, ranking online athletics results and sending the ranked results to each of the head-mounted devices that participate in the sports athletics, in order to display the ranked results in the 3D online sports athletics scene of each of the head-mounted devices; and after the sports athletics is finished, saving the athletics results as historical data.

The advantageous effects of the embodiments of the present disclosure are as follows: the present disclosure, by employing the head-mounted device and the intelligent terminals having a step counting function, can realize remote running appointment. The present disclosure, at the starting of the sports athletics, utilizes the virtual reality technology of the head-mounted devices to virtualize the friends in different locations into the same 3D online sports athletics scene, and, during the process of the sports athletics, uploads the step counting data of the intelligent terminals to the cloud server on the basis of the wireless connection technology of the head-mounted devices, to realize the sharing of the step counting data of the friends by the cloud server, and displays online in real time the step counting data of each of the head-mounted device users in the virtual scene on the basis of the shared step counting data of the friends, to realize a sports athletics where a plurality of persons are simultaneously online.

BRIEF DESCRIPTION OF THE DRAWINGS

The present invention will hereinafter be described in conjunction with the following drawing figures, wherein like numerals denote like elements, and:

FIG. 1 is the structural block diagram of the system for 3D online sports athletics provided by the first embodiment; and FIG. 2 is the flow chart of the method for 3D online sports athletics provided by the second embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Embodiments of the present disclosure will be described below in further detail in conjunction with figures to make the objectives, technical solutions and advantages of the present disclosure clearer.

The First Embodiment

FIG. 1 is the structural block diagram of the system for 3D online sports athletics provided by the present embodiment. As shown in FIG. 1, the system for 3D online sports athletics comprises: a cloud server 1 and several head-mounted devices 2 having a virtual reality function, wherein each of the head-mounted devices 2 is paired with an intelligent terminal 3 having a step counting function, and each of the head-mounted devices 2 is assigned a unique ID in the cloud server 1, and is under the centralized management by the cloud server 1;

each of the head-mounted devices comprises a 3D scene virtualizing unit 21, a wirelessly connecting unit 22 and a processing unit 23;

the 3D scene virtualizing unit 21 is configured to virtualize a 3D online sports athletics scene to display the virtualized objects of all the head-mounted device users that participate in the sports athletics;

the wirelessly connecting unit 22 is configured to, during the process of the sports athletics, wirelessly connect the intelligent terminal 3 that it is paired with and the cloud server 1; in the present embodiment, preferably, the wirelessly connecting unit comprises a Bluetooth module, the intelligent terminal is an intelligent bracelet or an intelligent watch, and the head-mounted device is Bluetooth-paired with the intelligent terminal via the Bluetooth module; and the processing unit 23 is configured to acquire, via the wirelessly connecting unit 22, in real time, step counting data of the intelligent terminal that it is paired with, upload in real time the acquired step counting data to the cloud server 1, and acquire the step counting data of other head-mounted devices from the cloud server 1; and drive the 3D scene virtualizing unit 21 to display online the step counting data of each of the head-mounted device users in its 3D online running athletics scene, to realize sports athletics where a plurality of persons are simultaneously online.

It should be explained that, the displaying online the step counting data of each of the head-mounted device users in the 3D online running athletics scene should be understood as that: the processing unit, according to the athletics scene, displays online the step counting data of each of the head-mounted device users in the 3D online running athletics scene, and, if the athletics scene is a running scene of an outdoor mode, according to the step counting data of each of the head-mounted device users, displays the front-and-back position relation of the virtualized objects of each of the head-mounted device users in the 3D online running athletics scene, to enable each of the head-mounted device users to intuitively know the playing conditions of all the participants.

The present embodiment, by employing the head-mounted device and the intelligent terminals having a step counting function, at the starting of the sports athletics, utilizes the virtual reality technology of the head-mounted devices to virtualize the friends in different locations into the same scene, and, during the process of the sports athletics, uploads the step counting data of the intelligent terminals to the cloud server on the basis of wireless connection technology, to realize the sharing of the step counting data of the friends by the cloud server, and displays online in real time each of the head-mounted device users in the virtual scene on the basis of the shared step counting data of the friends, thereby to realize sports athletics where a plurality of persons are simultaneously online.

It should be explained that, the several head-mounted devices of the present embodiment comprise one master head-mounted device, and the head-mounted devices other than the master head-mounted device are slave head-mounted devices; wherein, the processing unit of the master head-mounted device, at the starting of the sports athletics, determines slave head-mounted device users that participate in the sports athletics, and sends IDs of the head-mounted devices that participate in the sports athletics and a preset competition rule to the cloud server.

In practical implementing, a friend list maintained in the head-mounted device can be utilized to determine the slave head-mounted device users that participate in the sports athletics. For instance, the processing unit of the master head-mounted device sends an invitation to the head-mounted devices that are in the friend list and determines slave head-mounted device users that participate in the sports athletics. Alternatively, the positioning unit of the head-mounted device is utilized to determine the slave head-mounted device users that participate in the sports athletics. For instance, the processing unit of the master head-mounted device, according to position information that is positioned by the positioning unit, sends an invitation to nearby head-mounted devices and determines slave head-mounted device users that participate in the sports athletics. Preferably, the positioning unit of the master head-mounted device is a GPS positioning module.

In an implementation scheme of the present embodiment, an animation effect library is provided to realize the interaction between friends during the process of the sports athletics, which increases the enjoyment of the sports athletics. For instance, when the user A has overrun a certain friend, the user A may send him an animation saying that "I have overrun you, chase me now". Alternatively, when the user A has led a certain friend by a large score for a long time, the user A may show his contempt by sending an animation saying that "you are too slow, can you be faster?".

Specially, each of the head-mounted devices of the present implementation scheme further comprises a microphone for picking up a voice command;

the processing unit of each of the head-mounted devices converts the voice command picked up by the microphone into a digital voice command, and sends the digital voice command to the cloud server; the cloud server, according to the received digital voice command, selects a corresponding animation effect from an animation effect library stored in itself and sends the corresponding animation effect to each of the head-mounted devices that participate in the sports athletics, in order to display the animation effect in the 3D online sports athletics scene of each of the head-mounted devices.

It can be understood that, according to the performance requirement of the system, each of the head-mounted devices can also store an animation effect library, and the processing unit of the head-mounted device, according to the converted digital voice command, selects a corresponding animation effect from an animation effect library stored in itself and sends the corresponding animation effect to the cloud server, and the cloud server sends the animation effect to each of the head-mounted devices that participate in the sports athletics.

Certainly, in practical implementing, the cloud server can only send a corresponding animation effect to a corresponding head-mounted device, which the present embodiment will not specifically limit.

In another implementation scheme of the present embodiment, the cloud server further manages the step counting data and the historical data of each of the head-mounted device users.

Specially, during the process of the sports athletics, the cloud server, according to the step counting data uploaded in real time by each of the head-mounted devices that participate in the sports athletics, ranks online the athletics results and sends the ranked results to each of the head-mounted devices that participate in the sports athletics, in order to display the ranked results in the 3D online sports athletics scene of each of the head-mounted devices; and after the sports athletics is finished, the cloud server saves the ranked results as historical data.

In the present implementation scheme, the competition rule comprises sports scene, time, distance and so on, and the sports scene comprises sports scenes such as running and cycling. Within the athletics duration of the sports athletics, the cloud server, according to the step counting data uploaded by each of the head-mounted devices and the distance preset in the competition rule, takes statistics on the head-mounted device users that have completed the task (that is, have reached the preset distance), and dispatches the step counting data of the head-mounted device users that have completed the task to each of the head-mounted device users that participate in the sports athletics, to enable each of the head-mounted device users to in real time know the conditions of the participants of the sports athletics. After the athletics duration of the sports athletics ends, the cloud server, according to the step counting data uploaded by each of the head-mounted devices and the distance preset in the competition rule, adds 1 to the failure times of the individual historical data of the head-mounted device users that did not complete the task, and adds 1 to the success times of the individual historical data of the head-mounted device users that have complete the task, so that when the master head-mounted device user initiates sports athletics, he can select suitable slave head-mounted device users as the participants according to the individual historical data information.

In order to describe in detail the mode by which the present embodiment realizes online sports athletics by a plurality of persons simultaneously, description is made by referring to the following preferable embodiment:

In the present preferable embodiment, the sports athletics is specifically running athletics, and the intelligent terminal having a step counting function is preferably an intelligent bracelet.

Firstly, the head-mounted device user A is paired with his intelligent bracelet, and the wireless connection between the head-mounted device and the intelligent bracelet is realized via Bluetooth function.

Then, the head-mounted device user A logs on in the cloud server, and, as the initiator of the running athletics, sends to the cloud server a request for establishing a running athletics activity. The head-mounted device user A, after receiving the response of the cloud server, may, according to the friend list maintained in its head-mounted device, select corresponding friends from the friend list and send them an invitation, and, according to the responses of the friends, determine the slave head-mounted device users that participate in the running athletics activity.

Certainly, the head-mounted device user A may, according to the position information positioned by its GPS positioning module, send a invitation request to an auxiliary head-mounted device user of the head-mounted device user A, and, according to the response of the auxiliary head-mounted device users, determine the slave head-mounted device users that participate in the running athletics activity.

It should be explained that, the head-mounted device user A may, according to the historical data information of each of the slave head-mounted device users, eliminate unqualified persons, for instance, eliminate the persons that have too many failure times.

Finally, the head-mounted device user A sets the competition rule of the running athletics activity, for instance, setting rules such as running scene, running distance and running duration, wherein the running scene may be a running scene of outdoor mode or a running scene of gymnasia mode.

At the starting of the running athletics activity, the head-mounted device user A and each of the slave head-mounted device users, in the respective head-mounted devices, virtualize a 3D online sports athletics scene to display the virtualized objects of all the head-mounted device users that participate in the running athletics activity; during the process of the running athletics activity, each of the head-mounted devices uploads the respective step counting data to the cloud server, and, according to the step counting data dispatched by the cloud server, real-time displays the step counting data of each of the head-mounted device users; and after the end of the running athletics activity, the cloud server, according to the step counting data uploaded in real time by each of the head-mounted devices that participate in the sports athletics, ranks online the athletics results and sends the ranked results to each of the head-mounted devices that participate in the sports athletics, in order to display the ranked results in the 3D online sports athletics scene of each of the head-mounted devices, and the cloud server saves the athletics results as historical data.

Certainly, after the starting of the running athletics activity, each of the head-mounted device users may, via simple voice controlling, send an animation effect to the other persons that participate in the running athletics activity, for instance sending animation expressions such as encouragement, contempt and envying, in order to enhance the enjoyment of the running athletics activity.

The Second Embodiment

The present embodiment, on the basis of the same technical concept as the first embodiment, provides a method for 3D online sports athletics.

FIG. 2 is the flow chart of the method for 3D online sports athletics provided by the present embodiment. As shown in FIG. 2, the method in FIG. 2 comprises:

S210, providing a cloud server and several head-mounted devices having a virtual reality function, wherein each of the head-mounted devices is paired with an intelligent terminal having a step counting function, and each of the head-mounted devices is assigned a unique ID in the cloud server, and is under the centralized management by the cloud server.

The intelligent terminal in this step is preferably an intelligent bracelet or an intelligent watch.

S220, causing each of the head-mounted devices to virtualize a 3D online sports athletics scene to display the virtualized objects of all the head-mounted device users that participate in the sports athletics.

S230, during the process of the sports athletics, establishing a wireless connection between each of the head-mounted devices and the intelligent terminal that it is paired with, and a wireless connection between each of the head-mounted devices and the cloud server.

In this step, preferably, each of the head-mounted devices is via Bluetooth wirelessly connected with the intelligent terminal that it is paired with.

S240, causing each of the head-mounted devices to acquire, in real time, step counting data of the intelligent terminal that it is paired with, upload in real time the acquired step counting data to the cloud server, and acquire the step counting data of other head-mounted devices from the cloud server.

S250, displaying online the step counting data of each of the head-mounted device users in the 3D online running athletics scene of each of the head-mounted devices, to realize sports athletics where a plurality of persons are simultaneously online.

It should be explained that, the "displaying online the step counting data of each of the head-mounted device users in the 3D online running athletics scene of each of the head-mounted devices" in Step S250 should be understood as that: the processing unit, according to the athletics scene, displays online the step counting data of each of the head-mounted device users in the 3D online running athletics scene, and, if the athletics scene is a running scene of an outdoor mode, according to the step counting data of each of the head-mounted device users, displays the front-and-back position relation of the virtualized objects of each of the head-mounted device users in the 3D online running athletics scene, to enable each of the head-mounted device users to intuitively know the playing conditions of all the participants.

The present embodiment, by employing the head-mounted device and the intelligent terminals having a step counting function, at the starting of the sports athletics, utilizes the virtual reality technology of the head-mounted devices to virtualize the friends in different locations into the same scene, during the process of the sports athletics, uploads the step counting data of the intelligent terminals to the cloud server on the basis of wireless connection technology, to realize the sharing of the step counting data of the friends by the cloud server, and displays online in real time each of the head-mounted device users in the virtual scene on the basis of the shared step counting data of the friends, thereby to realize sports athletics where a plurality of persons are simultaneously online.

It should be explained that, the several head-mounted devices in Step S210 comprise one master head-mounted device, and the head-mounted devices other than the master head-mounted device are slave head-mounted devices;

at the starting of the sports athletics, the master head-mounted device determines slave head-mounted devices that participate in the sports athletics, and sends IDs of all the head-mounted devices that participate in the sports athletics and a preset competition rule to the cloud server, wherein the competition rule comprises sports scene, time and distance.

In practical implementing, a friend list maintained in the head-mounted device can be utilized to determine the slave head-mounted device users that participate in the sports athletics. For instance, the master head-mounted device sends an invitation to the head-mounted devices that are in its friend list and determines slave head-mounted devices that participate in the sports athletics. Alternatively, the positioning function of the head-mounted device is utilized to determine the slave head-mounted device users that participate in the sports athletics. For instance, the master head-mounted device, according to its position information, sends an invitation to nearby head-mounted devices and determines slave head-mounted devices that participate in the sports athletics.

In an implementation scheme of the present embodiment, an animation effect library is provided to realize the interaction between friends during the process of the sports athletics, which increases the enjoyment of the sports athletics. For instance, when the user A has overrun a certain friend, the user A may send him an animation saying that "I have overrun you, chase me now". Alternatively, when the user A has led a certain friend by a large score for a long time, the user A may show his contempt by sending an animation saying that "you are too slow, can you be faster?".

Specially, each of the head-mounted devices of the present implementation scheme is provided with a microphone, and utilizes the microphone to pick up a voice command of the user. When the microphone of the head-mounted device has picked up the voice command, the head-mounted device converts the voice command into a digital voice command and sends the digital voice command to the cloud server;

the cloud server, according to the received digital voice command, selects a corresponding animation effect from an animation effect library stored in itself and sends the corresponding animation effect to each of the head-mounted devices that participate in the sports athletics, in order to display the animation effect in the 3D online sports athletics scene of each of the head-mounted devices.

It can be understood that, according to the performance requirement of the system, each of the head-mounted devices can also store an animation effect library, and the head-mounted device, according to the converted digital voice command, selects a corresponding animation effect from an animation effect library stored in itself and sends the corresponding animation effect to the cloud server, and the cloud server sends the animation effect to each of the head-mounted devices that participate in the sports athletics.

Certainly, in practical implementing, the cloud server can only send a corresponding animation effect to a corresponding head-mounted device, which the present embodiment will not specifically limit.

In another implementation scheme of the present embodiment, the cloud server further manages the step counting data and the historical data of each of the head-mounted device users.

Specially, during the process of the sports athletics, the cloud server, according to the step counting data uploaded in real time by each of the head-mounted devices that participate in the sports athletics, ranks online the athletics result and sends the ranked results to each of the head-mounted devices that participate in the sports athletics, in order to display the ranked results in the 3D online sports athletics scene of each of the head-mounted devices; and after the sports athletics is finished, saves the athletics results as historical data.

To conclude, the present disclosure discloses a method and system for 3D online sports athletics. The present disclosure, by employing the head-mounted device and the intelligent terminals having a step counting function, can realize remote running appointment. The present disclosure, at the starting of the sports athletics, utilizes the virtual reality technology of the head-mounted devices to virtualize the friends in different locations into the same 3D online sports athletics scene, and, during the process of the sports athletics, uploads the step counting data of the intelligent terminals to the cloud server on the basis of the wireless connection technology of the head-mounted devices, to realize the sharing of the step counting data of the friends by the cloud server, and displays online in real time the step counting data of each of the head-mounted device users in the virtual scene on the basis of the shared step counting data of the friends, thereby to realize sports athletics where a plurality of persons are simultaneously online.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

The invention claimed is:

1. A system for 3D online sports athletics, comprises: a cloud server and several head-mounted devices having a virtual reality function, wherein each of the head-mounted devices is paired with an intelligent terminal having a step counting function, and each of the head-mounted devices is assigned a unique ID in the cloud server, and is under centralized management by the cloud server;

the several head-mounted devices comprise one master head-mounted device, and other head-mounted devices than the master head-mounted device are slave head-mounted devices;

the master head-mounted device is configured to, at starting of the sports athletics, determine slave head-mounted devices that participate in the sports athletics, and send IDs of all the head-mounted devices that participate in the sports athletics and a preset competition rule to the cloud server, wherein the competition rule comprises sports scene, time and distance;

each of the head-mounted devices comprises a 3D scene virtualizing unit, a wirelessly connecting unit and a processing unit;

the 3D scene virtualizing unit is configured to, at the starting of the sports athletics, virtualize a 3D online sports athletics scene to display virtualized objects of all head-mounted device users that participate in the sports athletics;

the wirelessly connecting unit is configured to, during the sports athletics, wirelessly connect the intelligent terminal that it is paired with and the cloud server; and the processing unit is configured to acquire, via the wirelessly connecting unit, in real time, step counting data of the intelligent terminal that it is paired with, upload in real time the acquired step counting data to the cloud server, and acquire the step counting data of other head-mounted devices from the cloud server; and drive the 3D scene virtualizing unit to display online the step counting data of each of the head-mounted device users in its 3D online sports athletics scene, to realize sports athletics where a plurality of persons are simultaneously online.

2. The system for 3D online sports athletics according to claim 1, wherein, each of the head-mounted devices maintains a friend list therein, and the master head-mounted device is specifically configured to send an invitation to head-mounted devices that are in the friend list in the master head-mounted device and determine slave head-mounted device users that participate in the sports athletics;

and/or, each of the head-mounted devices comprises a positioning unit, and the master head-mounted device is specifically configured to, according to position information that is positioned by the positioning unit in the master head-mounted device, send an invitation to nearby head-mounted devices and determine slave head-mounted device users that participate in the sports athletics.

3. The system for 3D online sports athletics according to claim 1, wherein each of the head-mounted devices further comprises a microphone for picking up a voice command;

each of the head-mounted devices is further configured to convert the voice command picked up by the microphone in the master head-mounted device into a digital voice command, and send the digital voice command to the cloud server; and the cloud server is configured to, according to the received digital voice command, select a corresponding animation effect from an animation effect library stored in itself and send the corresponding animation effect to each of the head-mounted devices that participate in the sports athletics; and each of the head-mounted devices is configured to display the animation effect in its 3D online sports athletics scene according to the animation effect sent by the cloud server.

4. The system for 3D online sports athletics according to claim 1, wherein the cloud server is further configured to, during the sports athletics, according to the step counting data uploaded in real time by each of the head-mounted devices that participate in the sports athletics, rank athletics results online and send the ranked results to each of the head-mounted devices that participate in the sports athletics, and after the sports athletics is finished, save the athletics results as historical data; and each of the head-mounted devices is configured to display the ranked results in its 3D online sports athletics scene according to the ranked results sent by the cloud server.

5. A method for 3D online sports athletics, comprises:

providing a cloud server and several head-mounted devices having a virtual reality function, wherein each of the head-mounted devices is paired with an intelligent terminal having a step counting function, each of the head-mounted devices is assigned a unique ID in the cloud server and is under centralized management by the cloud server, the several head-mounted devices comprise one master head-mounted device, and other head-mounted devices than the master head-mounted device are slave head-mounted devices;

at starting of the sports athletics, by the head-mounted device, determining slave head-mounted devices that participate in the sports athletics, and sending IDs of all the head-mounted devices that participate in the sports athletics and a preset competition rule to the cloud server, wherein the competition rule comprises sports scene, time and distance;

at the starting of the sports athletics, by the master head-mounted device and the slave head-mounted devices, virtualizing a 3D online sports athletics scene to display virtualized objects of all head-mounted device users that participate in the sports athletics;

during the sports athletics, by each of the head-mounted devices, establishing a wireless connection with the intelligent terminal that it is paired with, and a wireless connection with the cloud server;

acquiring in real time step counting data of the intelligent terminal that it is paired with, uploading in real time the acquired step counting data to the cloud server, and acquiring the step counting data of other head-mounted devices from the cloud server; and displaying online the step counting data of each of the head-mounted device users in its 3D online sports athletics scene, to realize sports athletics where a plurality of persons are simultaneously online.

6. The method for 3D online sports athletics according to claim 5, wherein the step that the master head-mounted device determines slave head-mounted devices that participate in the sports athletics comprises:

by the master head-mounted device, sending an invitation to head-mounted devices that are in its friend list and determining slave head-mounted devices that participate in the sports athletics;

and/or, by the master head-mounted device, according to its position information, sending an invitation to nearby head-mounted devices and determining slave head-mounted devices that participate in the sports athletics.

7. The method for 3D online sports athletics according to claim 5, wherein a microphone is provided on each of the head-mounted devices, and the method further comprises:

by the master head-mounted device, utilizing the microphone to pick up a voice command of its user, and converting the voice command into a digital voice command and sending the digital voice command to the cloud server;

by the cloud server, according to the received digital voice command, selecting a corresponding animation effect from an animation effect library stored in itself and sending the corresponding animation effect to each of the head-mounted devices that participate in the sports athletics; and by each of the head-mounted devices, displaying the animation effect in its 3D online sports athletics scene according to the animation effect sent by the cloud server.

8. The method for 3D online sports athletics according to claim 5, wherein the method further comprises:

during the sports athletics, by the cloud server, according to the step counting data uploaded in real time by each of the head-mounted devices that participate in the sports athletics, ranking athletics results online and sending the ranked results to each of the head-mounted devices that participate in the sports athletics, and after the sports athletics is finished, saving the athletics results as historical data; and by each of the head-mounted devices, displaying the ranked results in its 3D online sports athletics scene according to the ranked results sent by the cloud server.

\* \* \* \* \*